3,766,099
PROCESS FOR PREPARATION OF ETHYLENIC RESIN FOAM
Isamu Kawai, Ageo, Atsuro Nishikawa, Suita, Osamu Takagi, Kuki-machi, Akira Iwata, Shimamoto-machi, and Kohei Sugiyama, Ibaraki, Japan
No Drawing. Original application Oct. 7, 1969, Ser. No. 864,549, now Patent No. 3,657,165. Divided and this application Dec. 7, 1971, Ser. No. 205,702
Int. Cl. C08f 29/04, 47/10
U.S. Cl. 260—2.5 E
8 Claims

ABSTRACT OF THE DISCLOSURE

A process of producing an ethylenic resin foam by mixing and kneading an ethylenic resin with a volatile organic foaming agent under heating and pressure to form a flowable gel and releasing the pressure by extruding out the gel, characterized by the use as said foaming agent of a mixture comprising (A) dichlorodifluoromethane and (B) at least one compound selected from monochloropentafluoroethane and octofluorocyclobutane. The foaming agent may additionally contain one or more compounds selected from aliphatic hydrocarbons having a boiling point of about 0–70° C. and chlorofluorohydrocarbons having a boiling point of 0–70° C.

---

This application is a division of copending application Ser. No. 864,549 filed Oct. 7, 1969, now U.S. Pat. 3,657,-165.

The present invention relates to a process for the preparation of an ethylenic resin foam. In particular, the invention relates to a process for the preparation of a satisfactory ethylenic resin foam by extrusion foaming of ethylenic resins using as the foaming a mixture of dichlorodifluoromethane and a specific volatile organic compound.

It has hitheto been well known to prepare an ethylenic resin foam by mixing and kneading an ethylenic resin with a foaming agent consisting of a volatile organic compound under heating and pressure to foam a flowable gel and releasing the pressure by extruding out the gel.

In the above proces, it is necessary that the volatile organic compound used as the foaming agent should have a poor solvent capacity for ethylenic resins. For, if a volatile organic compound with a good solvent capacity is used, the separation of the foaming agent consisting of this volatile organic compound from the ethylenic resin is difficult and sufficient foaming can not be effected, since the affinity of the compound with the ethylenic resin is high even at the temperatures and pressures at which the compound is fully capable of being vapourized.

Dichlordiflouromethane meets the requirements for foaming agents for ethylenic resins, and dichlorodifluoromethane is easy to handle since it has a moderate boiling point, low toxicity and has no inflammability, and in addition, it is comparatively inexpensive. Therefore, it is a desirable foaming agent for ethylenic resins.

Although dichlorodifluoromethane has desirable properties as a foaming agent for ethylenic resins as described above, it has the following two main defects.

Namely, one defect is that notwithstanding that it is necessary to heat ethylenic resins at a temperature of at least 90° C. and preferably above 100° C. to impart them with sufficient fluidity for foaming, the boiling point of dichlorodifluoromethane is as low as −29.8° C., its critical temperature is 112° C., its critical pressure is 42.2 kg./cm.$^2$ and its saturated vapour pressure at 100° C. is as high as 34.1 kg./cm.$^2$. Therefore, the pressure on the resins in the extrusion apparatus must be maintained high, when an ethylenic resin is mixed and kneaded with dichlorodifluoromethane under heating and pressure. The mixture is fully gelled at a temperature of at least 90° C. and preferably above 100° C., the gel is extruded and is foamed by releasing the pressure, but if the pressure on the resin is made too high, the thin films forming the cells of the foam are destroyed by the higher vapour pressure of dichlorodifluoromethane, cracks are formed on the surface of the foam and the cells tend to become continuous at the time of foaming of the resin by a sudden release of pressure. Therefore, it is not easy to obtain a foam with good resiliency, and further the degree of effectiveness of the dichlorodifluoromethane in foaming of the resin becomes low since dissipation of the gas is high. Therefore, it is impossible to obtain a foam which has a uniform cellular structure and smooth surfaces and one which has been foamed to a high ratio.

The other defect is that since the gas permeability of dichlorodifluoromethane through the membranes constituting the cells of ethylenic resin foams is higher than the corresponding permeability of air, the ratio of permeation of air into the cells of the foam is slowesr than that of permeation of dichlorodifluoromethane within the cells into the atmosphere. Therefore, the pressure within the cells of the foam are gradually reduced with the passage of time, the cells are collapsed by the atmospheric pressure and the foam is remarkably contracted.

This remarkable contraction of the foam is gradually recovered as air replaces dichlorodifluoromethane, permeating the cells, but it is not restored substantially to the size of the foam immediately after preparation, and uneven wrinkles and hollows are formed on the surfaces of the foam, and the appearance of the foam is greatly impaired. The above contraction tends to become more remarkable as the cross-sectional area of the foam becomes larger.

It is described in the specification of U.S. Pat. No. 2,948,665 that the contraction of the foam and the destruction of the cells can be prevented by applying ionizing radiation to the flowable gel immediately before extrusion, but this method necessitates a complicated apparatus and its operation is technically very difficult.

Accordingly, an object of the present invention is to provide a process for the preparation of a highly resilient ethylenic resin foam which has been foamed to a high ratio and has a uniform cellular structure.

A further object of the present invention is to provide a process for the preparation of a foam having a smooth surface wherein no cracks are foamed on the surface of the foam during extrusion foaming.

Another object of the present invention is to provide a process for the preparation of a foam having a smooth surface wherein neither wrinkles nor hollows are formed on the surface because of the contraction of the foam with the passage of time.

Still another object of the present invention is to prepare a satisfactory foam using a simple apparatus. Other objects and the advantages of the present invention will be mde more clear by the following more detailed description of the present invention.

The above objects of the present invention can be accomplished by using a mixture comprising dichlorodifluoromethane and at least one compound selected from monochloropentafluoroethane and octofluorocyclobutane; or a mixture comprising dichlorofluoromethane at least one compound selected from monochloropentafluoroethane and octofluorocyclobutane, and at least one volatile organic compound selected from the group consisting of aliphatic hydrocarbons having a boiling point of about 0–70° C. and chlorofluorohydrocarbons having a boiling point of about 0–70° C. as the volatile organic foaming agent in extrusion foaming of ethylenic resins.

The ethylenic resins used in the present invention include ethylene homopolymers such as low density polyethylene, medium density polyethylene and high density polyethylene, and ethylene copolymers such as ethylene-vinyl acetate copolymer, ethylene-propylene copolymer, ethylene-1-butene copolymer, ethylene-methyl methacrylate copolymer and ethylene-acrylonitrile copolymer. As the ethylenic resin, it is preferable to use an ethylene homopolymer or copolymer having an ethylene content above 50% by weight, preferable above 75% by weight.

A first feature of the present invention resides in using a mixture comprising dichlorodifluoromethane and at least one compound selected from monochloropentafluoroethane (boiling point: −38.7° C., saturated vapour pressure at 100° C.: 47.0 kg./cm.$^2$) and octofluorocyclobutane (boiling point −5.8° C., saturated vapour pressure at 100° C.: 21.2 kg./cm.$^2$) as the volatile organic foaming agent. Further, a better result can be obtained, if the mixed foaming agent is incorporated in dichlorodifluoromethane in an amount of 5–30 parts by weight per 100 parts by weight of dichlorodifluoromethane.

As described above, such first feature of the present invention is that in a process for the preparation of an ethylenic resin foam by mixing and kneading an ethylenic resin with a volatile organic foaming agent under heating and pressure to form a flowable gel and releasing the pressure by extruding out the gel, a mixture comprising dichlorodifluoromethane and at least one compound selected from monochloropentafluoroethane and octofluorocyclobutane is used as the volatile organic foaming agent, and this mixed foaming agent has a far smaller gas permeability through the thin films constituting the cells of the foam as compared with the case where dichlorodifluoromethane alone is used as the foaming agent, and therefore, its replacement by air can be carried out satisfactorily without causing a substantial contraction of the foam. Accordingly, neither wrinkles nor hollows are formed on the surface of the foam, and a foam which has been foamed to a high ratio, is superior in dimensional stability and has a good surface condition to be obtained.

A second feature of the present invention resides in using a mixed foaming agent obtained by adding at least one volatile organic compound selected from the group consisting of aliphatic hydrocarbons having a boiling point of about 0–70° C., and chlorofluorohydrocarbons having a boiling point of about 0–70° C. to the mixture described in the first feature of the present invention. It is preferable that the volatile organic compound should be mixed in an amount of less than 50 parts by weight per 100 parts by weight of the total mixed foaming agent.

As the aliphatic hydrocarbons having a boiling point of about 0–70° C., for example, n-butane (boiling point: −0.5° C., saturated vapour pressure at 100° C.: 16.8 kg./cm.$^2$) pentane (boiling point: 36.1° C., saturated vapour pressure at 100° C.: 5.8 kg./cm.$^2$), petroleum ether (boiling point range: 40 −70° C., saturated vapour pressure at 100° C.: about 2–6 kg./cm.$^2$) etc. can be mentioned, and as the chlorofluorohydrocarbons having a boiling point of about 0–70° C., for example, trichloromonofluoromethane (boiling point: 23.8° C., saturated vapour pressure at 100° C.: 8.4 kg./cm.$^2$), trichlorotrifluoroethane (boiling point: 47.6° C., saturated vapour pressure at 100° C.: 4.5 kg./cm.$^2$), dichloromonofluoromethane (boiling point: 8.9° C., saturated vapour pressure at 100° C.: 15.0 kg./cm.$^2$), etc. can be mentioned.

The volatile organic compounds have a low saturated vapour pressure, and if a mixed foaming agent obtained by adding such volatile organic compounds to the mixture described above is used, the following advantages are obtained in addition to the advantages described in the first feature of the present invention.

Namely, since the mixed foaming agent has a lowered saturated vapour pressure and has a comparatively high affinity to ethylenic resins, the mixed foaming agent is mixed homogeneously with the ethylenic resin, and a comparatively slow expansion of the flowable gel takes place when it is extruded and the pressure is released, and as a result, the destruction of the thin films constituting the cells is prevented, the dissipation of the foaming agent is lowered and a foam which has a uniform cellular structure and has been foamed to a high ratio can be obtained.

Further, in the present invention, a rubbery material such as natural rubber, butadiene rubber, isobutylene rubber, acrylonitrile rubber, acrylonitrile-butadiene copolymer rubber or styrene-butadiene copolymer rubber may be mixed with the ethylenic resin. It is preferable that such a rubbery material should be mixed in an amount of 1–30 parts by weight, preferably 3–20 parts by weight, based on the weight of the ethylenic resin.

If such a rubbery material is added, it becomes very easy to make the viscosity of the resin suitable for expansion when the flowable gel is extruded and expanded by releasing the pressure, and the strength of the cells is improved and a foam foamed to a high ratio can be obtained easily, and further the resilience, flexibility and the mechanical strength of the foam can be improved.

Further, in the present invention, a powdery inorganic substance such as talc, clay, mica, silica, titanium oxide, zinc oxide or calcium silicate, a metallic salt of a fatty acid such as barium stearate, zinc stearate or aluminum stearate, or a combination of an organic acid such as tartaric acid, citric acid, oxalic acid or oleic acid and sodium carbonate or sodium bicarbonate may be added as foam controlling agents to control the size of the cells of the foam.

Further, in the present invention, the ethylenic resin and the mixed foaming agent are mixed and kneaded under heating and pressure by means of an extruding apparatus such as a screw type extruder to form a flowable gel and this gel is extruded into a lower pressure zone such as a zone under atmospheric pressure and is expanded by releasing the pressure, and the temperature in kneading and extrusion under heating and pressure can be adjusted at a temperature below or above the melting point of the ethylenic resin where a satisfactory flowable gel can be formed.

Further, in the present invention, it is preferable that the ethylenic resin and the mixed foaming agent should be mixed and kneaded in the vapour phase and the mixed foaming agent should be turned into liquid phase immediately before the extrusion. The mixed foaming agent has a larger specific volume in the liquid phase, and therefore, the mixed foaming agent in the vapour phase is well dispersed in kneading and the ethylenic resin and the mixed foaming agent are mixed homogeneously, and the mixed foaming agent in the liquid phase is vapourized readily in extrusion, and it takes the latent heat of vapourization from the resin as it is vapourized, the expanded resin is cooled satisfactorily, the contraction of the foam and the destruction of the cells can be prevented better and a satisfactory foam can be obtained.

In the present invention, the foam in any desirable shape can be obtained by extrusion, e.g. sheet, film, pipe or rod.

The following examples are given by way of illustration of the features of the invention, but should not be construed as limiting its scope.

EXAMPLE 1

The extrusion apparatus used in this example comprises a screw type extruder wherein a screw with 65 mm. in diameter, 2080 mm. in length and 65 mm. in unit pitch is provided in a cylinder and an injection opening for foaming agent is provided in the middle of the cylinder, and a metallic die having a nozzle of 8 mm. in diameter provided at the tip end of the extruder.

A granular polyethylene having a density of 0.92 g./cc. and a melt index of 2.0 and fine powdery talc in an amount of 0.8 part by weight per 100 parts by weight of the polyethylene were uniformly mixed, the mixture was fed into the entrance opening for raw material of the extruder, and then the resin was kneaded and extruded up to the position of the injection opening for foaming agent while maintaining the temperature of the cylinder up to the injection opening for foaming agent at 140° C.

Then, a mixed foaming agent having a composition as shown in the following Table 1 was injected into the injection opening for the foaming agent at a ratio of 15 parts by weight per 100 parts by weight of the resin, the resin was extruded from the nozzle of the metallic die into the atmosphere while maintaining the temperature of the cylinder up to 520 mm. after the injection opening for foaming agent at 120° C., the temperature of the cylinder thereafter at 100° C. and the temperature of the metallic die at 95° C., and thereby a foam was obtained.

For comparison, a foam was produced under the same conditions as Example 1 except that dichlorodifluoromethane alone was used as foaming agent.

Further, in Example 1, a, b and c and comparative Example 1, the perssures inside the cylinder at the inlet for the foaming agent were 55, 50, 50 and 55 kg./cm.$^2$, respectively, and the pressure inside the metallic die at the inlet for the resin were 58, 50, 52 and 60 kg./cm.$^2$, respectively. In each case, the pressure for injection of the foaming agent was 5–10 kg./cm.$^2$ higher than the pressure in the cylinder at the inlet for the foaming agent.

TABLE 1

| | Composition of foaming agents (parts by weight) | | | |
|---|---|---|---|---|
| | Dichlorodifluoromethane | Octofluorocyclobutane | Trichloromonofluoromethane | n-Butane |
| Example 1: | | | | |
| a | 90 | 10 | | |
| b | 45 | 10 | 45 | |
| c | 45 | 10 | | 45 |
| Comparative Ex. 1 | 100 | | | |

EXAMPLE 2

The extrusion apparatus used in this example comprises a screw type extruder wherein a screw with 50 mm. in diameter, 1500 mm. in length and 50 mm. in unit pitch is provided in a cylinder and an injection opening for the foaming agent is provided in the middle of the cylinder, and a metallic die having a nozzle of 3 mm. in diameter provided at the tip end of the extruder.

A granular polyethylene having a density of 0.92 g./cc. and a melt index of 2.0 and calcium cabonate in an amount of 2 parts by weight per 100 parts by weight of the polyethylene were uniformly mixed, the mixture was fed into the entrance opening for raw material of the extruder, and then the resin was kneaded and extruded up to the position of the injection opening for the foaming agent while maintaining the temperature of the cylinder up to the injection opening for the foaming agent at 140° C.

Then, a mixed foaming agent having a composition as shown in the following Table 3 was injected into the injection opening for the foaming agent at a ratio of 15 parts by weight per 100 parts by weight of the resin, the resin was extruded from the nozzle of the metallic die into the atmosphere while maintaining the temperature of the cylinder up to 350 mm. after the injection opening for the foaming agent at 120° C., the temperature of the cylinder thereafter at 100° C. and the temperature of the metallic die at 95° C., and thereby a foam was obtained.

Further, in Example 2, a, b, c, d, e and f, the pressures in the cylinder at the inlet for the foaming agent were 62, 60, 60, 50, 58 and 58 kg./cm.$^2$, respectively, and the pressures in the metallic die at the inlet for the resin were 85, 80, 80, 80, 75 and 75 kg./cm.$^2$, respectively. In each case, the pressure in injection of the foaming agent was 5–10 kg./cm.$^2$ higher than the pressure in the cylinder at the inlet for the foaming agent.

TABLE 3

| | Composition of foaming agent (parts by weight) | | | | |
|---|---|---|---|---|---|
| | Dichlorodidfluoromethane | Octofluorocyclobutane | Monochloropentafluoroethane | Trichlorofluoromethane | n-Butane |
| Ex. 3: | | | | | |
| a | 80 | | 20 | | |
| b | 40 | | 20 | 40 | |
| c | 40 | | 20 | | 40 |
| d | 85 | 5 | 10 | | |
| e | 45 | 5 | 10 | 40 | |
| f | 45 | 5 | 10 | | 40 |

TABLE 4

| | Specific volume, cc./g. | | | | | | | |
|---|---|---|---|---|---|---|---|---|
| No. of days passed | Directly after production | 2 days | 5 days | 10 days | 15 days | 20 days | 25 days | 30 days |
| Example 2: | | | | | | | | |
| a | 28 | 28 | 30 | 30 | 30 | 30 | 30 | 30 |
| b | 27 | 20 | 26 | 28 | 28 | 28 | 28 | 28 |
| c | 27 | 20 | 25 | 27 | 28 | 28 | 28 | 28 |
| d | 30 | 32 | 33 | 33 | 33 | 33 | 33 | 33 |
| e | 28 | 22 | 27 | 30 | 30 | 30 | 30 | 30 |
| f | 28 | 21 | 26 | 29 | 29 | 29 | 29 | 29 |

The relation between the number of days passed after the formation of the foam and the specific volume of the foam was measured, and the results as shown in the following Table 2 were obtained.

TABLE 2

| | Specific volume, cc./g. | | | | | | | |
|---|---|---|---|---|---|---|---|---|
| No. of days passed | Directly after production | 2 days | 5 days | 10 days | 15 days | 20 days | 25 days | 30 days |
| Example 1: | | | | | | | | |
| a | 33 | 36 | 37 | 37 | 37 | 37 | 37 | 37 |
| b | 30 | 23 | 28 | 31 | 32 | 32 | 32 | 32 |
| c | 30 | 23 | 27 | 27 | 32 | 32 | 32 | 32 |
| Comparative Ex. 1 | 32 | 21 | 20 | 23 | 25 | 27 | 28 | 28 |

As may be clear from the above results of Examples 1 and 2, when mixed foaming agents comprising dichlorodifluoromethane and at least one compound selected from monochloropentafluoroethane and octofluorocyclobutane were used as the foaming agents, the contraction of the foams was prevented and foams having a high expansion ratio, a high dimensional stability and a good surface condition were obtained.

Especially in the foams obtained in Example 1, a and Example 2, a and d, entirely no contraction of the foams was recognized, entirely no wrinkles or hollows were formed on the surface, the surface condition was good and the specific volume increased from the specific volume measured directly after production with the passage of time and reached an equilibrium. This increase in specific volume was caused because the weight of the foam escaped through the thin films contstituting the cells, while the volume of the foam remained almost constant.

In the foams obtained in Example 1, b and c and Example 2, b, c, e and f, a slight contraction of the foam was recognized at first, but the specific volume was restored to the specific volume measured directly after production of the foam or was increased even larger than that in about 10 days, and with the restoration of the specific volume the wrinkles and hollows on the surface of the foam were eliminated and the surface condition was improved, and the foams thus obtained were satisfactory for practical use.

On the other hand, in the foam obtained in comparative Example 1, a remarkable contraction of the foam was recognized in a few days after production of the foam, its recovery from the contraction thereafter was so slow that about 30 days were taken in reaching an equilibrium, and the foam was not restored to the specific volume measured directly after production even when the equilibrium was reached, and the wrinkles and hollows on the surface of the foam remained.

What is claimed is:

1. In a process for producing an ethylenic resin foam comprising mixing and kneading an ethylenic resin selected from the group consisting of ethylene homopolymers and copolymers of at least 50% by weight ethyelne and a monomer copolymerizable with ethylene, with a violatile organic foaming agent under conditions of heating and pressure to form a flowable gel and releasing the pressure by extruding out said gel, the improvement wherein said foaming agent comprises a mixture of (A) dichlorofluoromethane and (B) from 5–30 parts by weight per 100 parts by weight of said dichlorodifluoromethane of at least one compound selected from the group consisting of monochloropentafluoroethane and octofluorocyclobutane.

2. The process of claim 1 wherein said ethylenic resin is selected from the group consisting of low density polyethylene, medium density polyethylene, high density polyethylene, ethylene-vinyl acetate copolymer, ethylene-propylene copolymer, ethylene-butene-1 copolymer, ethylene-butadiene copolymer, ethylene-vinyl chloride copolymer, ethylene-methyl methacrylate copolymer, ethylene-acrylonitrile copolymer and blends thereof.

3. The process of claim 2 wherein said resin further contains a rubbery material selected from the group consisting of natural rubber, butadiene rubber, isobutylene rubber, acrylonitrile rubber, acrylonitrile-butadiene copolymer and styrene-butadiene copolymer rubber.

4. In a process for producing an ethylenic resin foam comprising mixing and kneading an ethylenic resin selected from the group consisting of ethylene homopolymers of at least 50% by weight ethylene and a monomer copolymerizable with ethylene, with a volatile organic foaming agent under conditions of heating and pressure to form a flowable gel and releasing the pressure by extruding out said gel, the improvement wherein said foaming agent comprises a mixture of (A) dichlorodifluoromethane, (B) from 5–30 parts by weight per 100 parts by weight of said dichlorodifluoromethane of at least one compound selected from the group consisting of monochloropentafluoroethane and octofluorocyclobutane, and (C) at least one compound selected from the group consisting of aliphatic hydrocarbons having a boiling point of about 0–70° C. and chlorofluorohydrocarbons having a boiling point of about 0–70° C.

5. The process of claim 4 wherein said ethylenic resin is selected from the group consisting of low density polyethylene, medium density polyethylene, high density polyethylene, ethylene-vinyl acetate copolymer, ethylene-propylene copolymer, ethylene-butene-1 copolymer, ethylene-butadiene copolymer, ethylene-vinyl chloride copolymer, ethylene-methyl methacrylate copolymer, ethylene-acrylonitrile copolymer and blends thereof.

6. The process of claim 5 wherein said resin further contains a rubbery material selected from the group consisting of natural rubber, butadiene rubber, isobutylene rubber, acrylonitrile rubber, acrylonitrile-butadiene copolymer rubber and styrene-butadiene copolymer rubber.

7. The process of claim 4 wherein compound (C) is mixed in an amount of not more than 50 parts by weight per 100 parts by weight of the sum (A), (B) and (C).

8. The process of claim 4 wherein compound (C) is a compound selected from the group consisting of n-butane, pentane, petroleum ether, trichloromonofluoromethane, trichlorotrifluoroethane and dichloromonofluoromethane.

References Cited
UNITED STATES PATENTS
3,644,230   2/1972   Cronin _____ 260—2.5 E
3,491,173   1/1970   Kobsa _____ 260—2.5 E

FOREIGN PATENTS
730,745   3/1966   Canada _____ 260—2.5 E

WILBERT J. BRIGGS, SR., Primary Examiner

U.S. Cl. X.R.

260—2.5 HA, 33.8 UA, 33.6 PQ, 94.9 GD, 87.3, 86.7, 88.2 S

UNITED STATES PATENT OFFICE
CERTIFICATE OF CORRECTION

Patent No. 3,766,099      Dated October 16, 1973

Inventor(s)    ISAMU KAWAI ET AL

It is certified that error appears in the above-identified patent and that said Letters Patent are hereby corrected as shown below:

In the Heading: insert --assignors to SEKISUI KAGAKU KOGYO KABUSHIKI KAISHA, Osaka, Japan, a Corporation of Japan.

In the Heading: insert --Claims priority, Japanese Application 74489/68, October 11, 1968--

Column 7, claim 3, line 5 thereof: after "mer" insert --rubber--

Column 8, claim 4, line 4 thereof: after "mers" insert --and copolymers--

Signed and sealed this 26th day of February 1974.

(SEAL)
Attest:

EDWARD M. FLETCHER, JR.
Attesting Officer

C. MARSHALL DANN
Commissioner of Patents